United States Patent
Dvorak et al.

(10) Patent No.: US 7,532,457 B2
(45) Date of Patent: May 12, 2009

(54) FUSED ELECTROLYTIC CAPACITOR ASSEMBLY

(75) Inventors: Leos Dvorak, Ceska Třebová (CZ); Stanislav Zednicek, Lanskroun (CZ); Zdenek Sita, Lanskroun (CZ); Ales Vyroubal, Postrelmov (CZ); Radek Matousek, Moravska Trebova (CZ)

(73) Assignee: AVX Corporation, Myrtle Beach, SC (US)

( * ) Notice: Subject to any disclaimer, the term of this patent is extended or adjusted under 35 U.S.C. 154(b) by 202 days.

(21) Appl. No.: 11/623,165

(22) Filed: Jan. 15, 2007

(65) Prior Publication Data

US 2008/0170354 A1 Jul. 17, 2008

(51) Int. Cl.
*H01G 9/04* (2006.01)
*H01G 9/145* (2006.01)

(52) U.S. Cl. .................. 361/528; 361/532; 29/25.03
(58) Field of Classification Search .......... 361/523, 361/528–529, 532, 540; 29/25.03
See application file for complete search history.

(56) References Cited

U.S. PATENT DOCUMENTS

| | | | |
|---|---|---|---|
| 3,345,545 A | 10/1967 | Bourgault et al. | |
| 4,085,435 A | 4/1978 | Galvagni | |
| 4,224,656 A * | 9/1980 | DeMatos et al. | 361/534 |
| 4,539,620 A | 9/1985 | Gray | |
| 4,539,623 A | 9/1985 | Irikura et al. | |
| 4,639,836 A | 1/1987 | Crowley, Jr. | |
| 4,660,127 A | 4/1987 | Gunter | |
| 4,757,423 A | 7/1988 | Franklin | |
| 4,763,228 A | 8/1988 | Su | |
| 4,899,258 A | 2/1990 | Gouvernelle | |
| 4,907,131 A | 3/1990 | Neal | |
| 4,945,452 A | 7/1990 | Sturmer et al. | |
| 5,011,067 A | 4/1991 | Foisy | |
| 5,019,457 A | 5/1991 | Nishio | |
| 5,049,979 A | 9/1991 | Hashemi et al. | |
| 5,095,297 A | 3/1992 | Perreault et al. | |

(Continued)

FOREIGN PATENT DOCUMENTS

JP 6455925 3/1989

(Continued)

OTHER PUBLICATIONS

Article—*Simple synergies boost capacitor reach*, Sally Ward-Foxton, Components in Electronics, Apr. 2006, 2 pages.

(Continued)

*Primary Examiner*—Eric Thomas
(74) *Attorney, Agent, or Firm*—Dority & Manning, P.A.

(57) ABSTRACT

A fused electrolytic capacitor assembly that offers improved performance characteristics in a convenient and space-saving package is provided. More specifically, the fused electrolytic capacitor assembly contains an electrolytic capacitor element and a surface mount fuse that are contained within a case and connected to a common anode termination. During initial production, the electrolytic capacitor element and fuse are connected to the anode termination so that the fuse is bypassed during testing of the individual capacitor element. After testing, the anode termination may be cropped so that the fuse and capacitor element become connected in series. Thus, during use, the fuse will disintegrate in response to an excessive current resulting from a short circuit discharge, which breaks the electrical connection between the capacitor element and limits the likelihood of fire or other damage remaining circuit elements.

25 Claims, 6 Drawing Sheets

U.S. PATENT DOCUMENTS

| | | | |
|---|---|---|---|
| 5,099,218 A | 3/1992 | Salisbury | |
| 5,099,397 A | 3/1992 | Edson et al. | |
| 5,166,656 A | 11/1992 | Badihi et al. | |
| 5,168,434 A | 12/1992 | Kobayashi | |
| 5,177,674 A | 1/1993 | Sugisaki | |
| 5,179,507 A * | 1/1993 | Iijima | 361/534 |
| 5,198,868 A | 3/1993 | Saito et al. | |
| 5,206,798 A | 4/1993 | Sugisaki | |
| 5,216,584 A | 6/1993 | Okazaki et al. | |
| 5,224,261 A | 7/1993 | Morrill, Jr. | |
| 5,228,188 A | 7/1993 | Badihi et al. | |
| 5,296,833 A | 3/1994 | Breen et al. | |
| 5,357,399 A | 10/1994 | Salisbury | |
| 5,394,295 A | 2/1995 | Galvagni et al. | |
| 5,469,326 A * | 11/1995 | Kanetake | 361/534 |
| 5,478,965 A | 12/1995 | Hashiba | |
| 5,495,386 A | 2/1996 | Kulkarni | |
| 5,576,927 A | 11/1996 | Sekiguchi | |
| 5,583,740 A * | 12/1996 | Fujino | 361/534 |
| 5,629,830 A | 5/1997 | Yamagami et al. | |
| 5,661,628 A * | 8/1997 | Yamagami | 361/275.4 |
| 5,716,420 A * | 2/1998 | Kuriyama | 29/25.03 |
| 6,197,252 B1 | 3/2001 | Bishop et al. | |
| 6,322,912 B1 | 11/2001 | Fife | |
| 6,370,009 B1 | 4/2002 | Fellers et al. | |
| 6,411,498 B2 | 6/2002 | Nakamura | |
| 6,423,104 B1 | 7/2002 | Omori et al. | |
| 6,577,486 B1 | 6/2003 | Nishimiya et al. | |
| 6,613,190 B2 | 9/2003 | Omori et al. | |
| 6,665,172 B1 * | 12/2003 | Kim et al. | 361/523 |
| 6,674,635 B1 | 1/2004 | Fife et al. | |
| 6,724,214 B2 | 4/2004 | Manna et al. | |
| 6,735,074 B2 | 5/2004 | Nakamura et al. | |
| 6,751,085 B1 | 6/2004 | Huntington | |
| 6,864,147 B1 | 3/2005 | Fife et al. | |
| 6,870,727 B2 | 3/2005 | Edson et al. | |
| 6,882,045 B2 | 4/2005 | Massingill et al. | |
| 6,882,520 B2 | 4/2005 | Kamigawa et al. | |
| 7,053,644 B1 | 5/2006 | Lindsey et al. | |
| 7,082,025 B2 | 7/2006 | Tamura | |
| 7,116,548 B2 | 10/2006 | Satterfield, Jr. et al. | |
| 2001/0014005 A1 * | 8/2001 | Nakamura | 361/523 |
| 2002/0085335 A1 * | 7/2002 | Nakamura | 361/302 |
| 2006/0038304 A1 | 2/2006 | Osako et al. | |
| 2007/0109727 A1 * | 5/2007 | Edson et al. | 361/600 |

FOREIGN PATENT DOCUMENTS

JP       01268014 A * 10/1989

OTHER PUBLICATIONS

Product Information—TBW Series (Tantalum Fused Capacitor), AVX Corporation, 1 page.
Product Information—Accu-Guard® (SMD Thin-Film Fuse), AVX Corporation, 18 pages.
U.S. Appl. No. 11/282,111, filed Nov. 17, 2005, Edson et al., Electrolytic Capacitor with a Thin Film Fuse.

* cited by examiner

FUSED ELECTROLYTIC CAPACITOR ASSEMBLY

BACKGROUND OF THE INVENTION

Solid electrolytic capacitors, such as tantalum capacitors, are traditionally known for their high capacitance value and compactness. Fuses are often employed in such capacitors to prevent burning upon exposure to overcurrent conditions. A typical fuse assembly employs a small conductive wire that disintegrates in response to excessive electrical current. Typically, one end of the fuse is soldered to a metal conducting foil edge of an electrolytic capacitor element and the other end of the fuse is soldered to a metal collector bus. When an electrolytic capacitor element fails, it creates a short circuit through which energy stored therein may discharge. The fuse disintegrates in response to the excessive current resulting from this discharge, which breaks the electrical connection between the failed element and the collector bus. Because the failed element is thus removed from the circuit, the capacitor can continue to operate using the remaining elements until enough elements fail to cause overvoltage or unbalance conditions that exceed set protective levels. Unfortunately, however, the use of a fusible protective feature in a capacitor assembly may have an adverse effect on electrical performance. For example, the overall equivalent series resistance (ESR) of a finished device often increases upon incorporation of a fuse.

As such, a need currently exists for a relatively simple and inexpensive fused capacitor assembly that is able to better satisfy industry requirements regarding size and performance.

SUMMARY OF THE INVENTION

In accordance with one embodiment of the present invention, a fused electrolytic capacitor assembly is disclosed. The assembly comprises an electrolytic capacitor element comprising an anode and solid electrolyte overlying the anode, wherein an anode lead extends from the anode. A cathode termination is electrically connected to the solid electrolyte. The assembly also comprises an anode termination that contains an anode coupling portion electrically connected to the anode lead and a fuse coupling portion electrically connected to a surface mount fuse. The anode lead is positioned above the fuse coupling portion and the surface mount fuse is positioned below the fuse coupling portion. A case encapsulates the electrolytic capacitor element and the surface mount fuse and leaves at least a portion of the anode and cathode terminations exposed.

In accordance with another embodiment of the present invention, a method of forming a fused electrolytic capacitor assembly is disclosed. The method comprises providing an electrolytic capacitor element comprising an anode and solid electrolyte overlying the anode, wherein an anode lead extends from the anode. A lead frame is provided that defines a cathode termination and an anode termination. The anode termination includes an anode coupling portion and a fuse coupling portion. The anode lead is laser welded to the anode coupling portion and a surface mount fuse is electrically connected to the fuse coupling portion. The solid electrolyte is electrically connected to the cathode termination. Further, electrolytic capacitor element and the surface mount fuse are encapsulated so that at least a portion of the anode termination and the cathode termination remains exposed for mounting to a surface.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of references characters in the present specification and drawings is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a fused electrolytic capacitor assembly that offers improved performance characteristics in a convenient and space-saving package. More specifically, the fused electrolytic capacitor assembly contains an electrolytic capacitor element and a surface mount fuse that are contained within a case and connected to a common anode termination. During initial production, the electrolytic capacitor element and fuse are connected to the anode termination so that the fuse is bypassed during testing of the individual capacitor element. After testing, the anode termination may be cropped so that the fuse and capacitor element become connected in series. Thus, during use, the fuse will disintegrate in response to a certain thermal energy associated with current flow (i.e., $I_{RMS}^2 t$, wherein $I_{RMS}$ is the root mean square current and t is the duration of the current flow in seconds), which breaks the electrical connection with the capacitor element and limits the likelihood of fire or other damage remaining circuit elements.

I. Electrolytic Capacitor Element

The electrolytic capacitor element may be formed using any of a variety of techniques. For example, the electrolytic capacitor element typically contains an anode formed from a valve metal composition. The valve metal composition may have a high specific charge, such as about 5,000 microFarads*Volts per gram ("μF*V/g") or more, in some embodiments about 10,000 μF*V/g or more, in some embodiments from about 15,000 μF*V/g to about 250,000 μF*V/g or more. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the anode may be formed from a valve metal oxide having an atomic ratio of metal to oxygen of 1: less than 25, in some embodiments 1: less than 2.0, in some embodiments 1: less than 1.5, and in some embodiments, 1:1. Examples of such valve metal oxides may include niobium oxide (e.g., NbO), tantalum oxide, etc., and are described in more detail in U.S. Pat. No. 6,322,912 to Fife, which is incorporated herein in its entirety by reference thereto for all purposes.

Conventional fabricating procedures may generally be utilized to form the anode. In one embodiment, a tantalum or niobium oxide powder having a certain particle size is first selected. The particle size may vary depending on the desired voltage of the resulting electrolytic capacitor element. For example, powders with a relatively large particle size (e.g., about 10 micrometers) are often used to produce high voltage capacitors, while powders with a relatively small particle size (e.g., about 0.5 micrometers) are often used to produce low voltage capacitors. The particles are then optionally mixed with a binder and/or lubricant to ensure that the particles adequately adhere to each other when pressed to form the anode. Suitable binders may include camphor, stearic and other soapy fatty acids, Carbowax (Union Carbide), Glyptal (General Electric), polyvinyl alcohols, napthaline, vegetable wax, and microwaxes (purified paraffins). The binder may be dissolved and dispersed in a solvent. Exemplary solvents may include water; acetone; methyl isobutyl ketone; trichloromethane; fluorinated hydrocarbons (freon) (DuPont); alcohols; and chlorinated hydrocarbons (carbon tetrachloride). When utilized, the percentage of binders and/or lubricants may vary from about 0.1% to about 8% by weight of the total mass. It should be understood, however, that binders and lubricants are not required in the present invention. Once formed, the powder is compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode wire (e.g., tantalum wire). It should be further appreciated that the anode wire may alternatively be attached (e.g., welded) to the anode subsequent to pressing and/or sintering of the anode.

After compression, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum. Upon sintering, the pellet shrinks due to the growth of bonds between the particles. In addition to the techniques described above, any other technique for forming the anode may also be utilized in accordance with the present invention, such as described in U.S. Pat. No. 4,085,435 to Galvagni; U.S. Pat. No. 4,945,452 to Sturmer, et al.; U.S. Pat. No. 5,198,968 to Galvagni; U.S. Pat. No. 5,357,399 to Salisbury; U.S. Pat. No. 5,394,295 to Galvagni, et al.; U.S. Pat. No. 5,495,386 to Kulkarni; and U.S. Pat. No. 6,322,912 to Fife, which are incorporated herein in their entirety by reference thereto for all purposes.

Regardless of the particular manner in which it is form, the thickness of the anode may be selected to improve the electrical performance of the electrolytic capacitor element. For example, the thickness of the anode (in the −z direction in FIG. 1) may be about 4 millimeters or less, in some embodiments, from about 0.2 to about 3 millimeters, and in some embodiments, from about 0.4 to about 2 millimeters. Such a relatively small anode thickness (i.e., "low profile") helps dissipate heat generated by the high specific charge powder and also provide a shorter transmission path to minimize ESR and inductance. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn et al., all of which are incorporated herein in their entirety by reference thereto for all purposes.

The anode may be anodized so that a dielectric film is formed over and within the porous anode. Anodization is an electrical chemical process by which the anode metal is oxidized to form a material having a relatively high dielectric constant. For example, a tantalum anode may be anodized to form tantalum pentoxide ($Ta_2O_5$), which has a dielectric constant "k" of about 27. The anode may be dipped into a weak acid solution (e.g., phosphoric acid) at an elevated temperature (e.g., about 85° C.) that is supplied with a controlled amount of voltage and current to form a tantalum pentoxide coating having a certain thickness. The power supply is initially kept at a constant current until the required formation voltage is reached. Thereafter, the power supply is kept at a constant voltage to ensure that the desired dielectric quality is formed over the surface of the tantalum pellet. The anodization voltage typically ranges from about 5 to about 200 volts, and in some embodiments, from about 20 to about 100 volts. In addition to being formed on the surface of the anode, a portion of the dielectric oxide film will also typically form on the surfaces of the pores. It should be understood that the dielectric film may be formed from other types of materials and using different techniques.

Once the dielectric film is formed, a protective coating may optionally be applied, such as one made of a relatively insulative resinous material (natural or synthetic). Such materials may have a resistivity of greater than about 0.05 ohm-cm, in some embodiments greater than about 5, in some embodiments greater than about 1,000 ohm-cm, in some embodiments greater than about $1\times10^5$ ohm-cm, and in some embodiments, greater than about $1\times10^{10}$ ohm-cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

The anodized part is thereafter subjected to a step for forming an electrolyte (e.g., solid electrolyte), which acts as the true cathode of the electrolytic capacitor element. The electrolyte may be formed by pyrolytic decomposition of manganous nitrate $(Mn(NO_3)_2)$ to form a manganese dioxide $(MnO_2)$ cathode. Such techniques are described, for instance, in U.S. Pat. No. 4,945,452 to Sturmer, et al., which is incorporated herein in its entirety by reference thereto for all purposes. Alternatively, a conductive polymer coating may be used to form the solid electrolyte. The conductive polymer coating may contain one or more conductive polymers, such as polypyrroles; polythiophenes, such as poly(3,4-ethylenedioxy thiophene) (PEDT); polyanilines; polyacetylenes; poly-p-phenylenes; and derivatives thereof. Moreover, if desired, the conductive polymer coating may also be formed from multiple conductive polymer layers. For example, in one embodiment, the conductive polymer coating may contain one layer formed from PEDT and another layer formed from a polypyrrole. Various methods may be utilized to apply the conductive polymer coating onto the anode part. For instance, conventional techniques such as electropolymerization, screen-printing, dipping, electrophoretic coating, and spraying, may be used to form a conductive polymer coating. In one embodiment, for example, the monomer(s) used to form the conductive polymer (e.g., 3,4-ethylenedioxy thiophene), may initially be mixed with a polymerization catalyst to form a solution. For example, one suitable polymerization catalyst is BAYTRON C, which is iron III toluenesulphonate and n-butanol and sold by Bayer Corporation. BAYTRON C is a commercially available catalyst for BAYTRON M, which is 3,4-ethylene dioxythiophene, a PEDT monomer also sold by Bayer Corporation. In most embodiments, once applied, the conductive polymer is healed. Healing may occur after each application of a conductive polymer layer or may occur after the application of the entire conductive polymer coating. Although various methods have been described above, it should be understood that any other method for applying the electrolyte may also be utilized in the present invention.

Once the solid electrolyte is formed, the part may then be applied with a carbon coating (e.g., graphite) and silver coating, respectively. The silver coating may, for instance, act as a solderable conductor, contact layer, and/or charge collector for the electrolytic capacitor element and the carbon coating may limit contact of the silver coating with the solid electrolyte. The overall thickness of the electrolytic capacitor element may range from about 5 millimeters or less, in some embodiments, from about 0.2 to about 4 millimeters, and in some embodiments, from about 0.4 to about 3 millimeters.

II. Surface Mount Fuse

The particular structure of the fuse is not critical to the present invention, so long as it is capable of being surface mounted to the anode termination of the capacitor assembly as described below. For example, the fuse may contain an electrically conductive film that defines a fuse element having a pair of contact portions interconnected by at least one link that it is fusible in response to a predetermined current therethrough. Any conductive material may be employed to form the conductive film, such as tantalum, niobium, aluminum, hafnium, titanium, etc. The conductive film may have a relatively small thickness, such as from about 0.1 to about 10 micrometers, and in some embodiments, from about 0.4 to about 4 micrometers. Of course, larger thicknesses may also be employed, such as about 10 micrometers or more, and in some embodiments, about 100 micrometers or more.

The conductive film may be positioned adjacent to one or more insulating substrates (e.g., glass) having a relatively small thickness, such as from about 0.05 to about 1 millimeter, and in some embodiments, from about 0.1 to about 0.5 millimeters. Although not necessarily required, the surface mount fuse may also contain one or more cover layers having a relatively small thickness, such as from about 0.05 to about 1 millimeter, and in some embodiments, from about 0.1 to about 0.5 millimeters. The cover layers may be formed from an insulating material that has better mechanical properties than the substrate (e.g., glass) to strengthen the overall fuse structure and allow for higher voltage ratings without modifying fuse speed. The cover layer materials may also be temperature stable and hermetic, thereby protecting the fuse element upon exposure to high temperature and humidity environments. Examples of such high strength, temperature stable materials may include, for instance, alumina, sapphire, etc.

Figure 6:
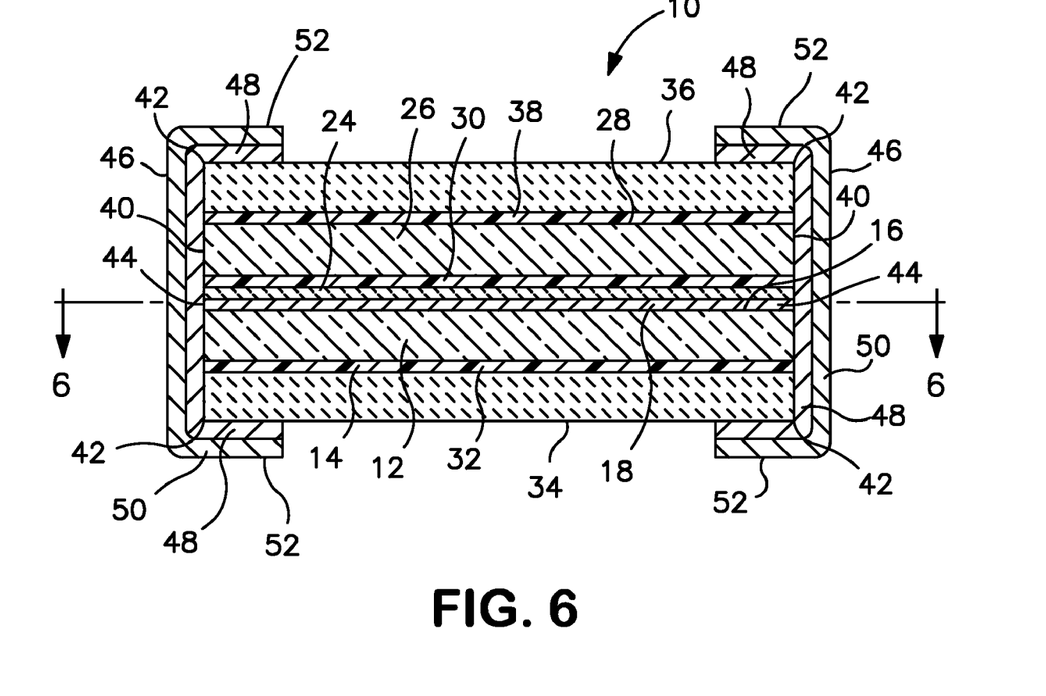
FIG. 6 is a side view of a surface mount thin film fuse that may be used in one embodiment of the present invention.
Figure 7:
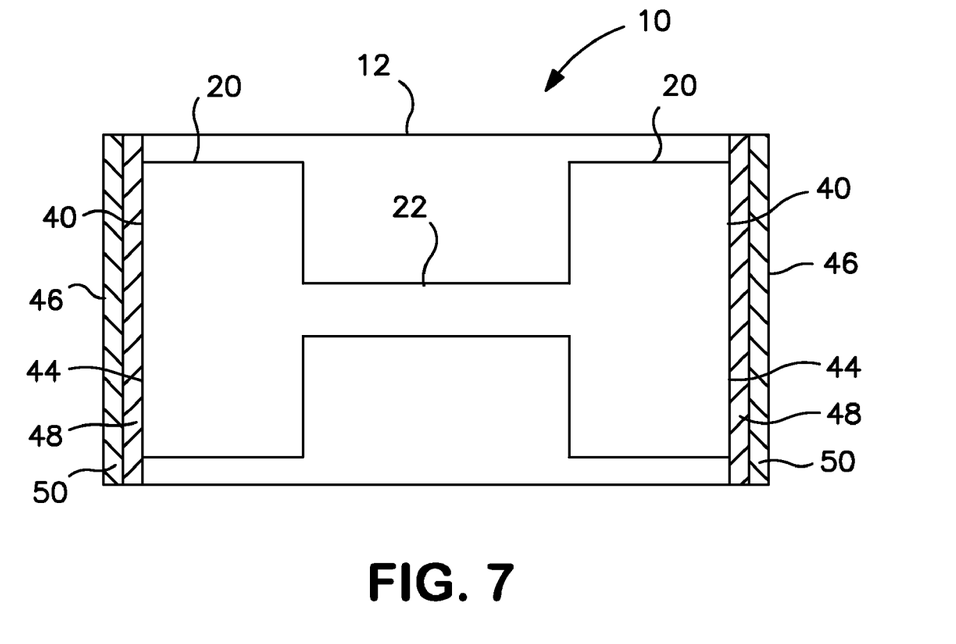
FIG. 7 is a cross-sectional view of the fuse of FIG. 6 taken along a line 6-6.

Various examples of suitable thin film fuses, such as described above, may be described in more detail in U.S. Pat. No. U.S. Pat. No. 5,296,833 to Breen, et al.; U.S. Pat. No. 5,228,188 to Breen, et al.; and U.S. Pat. No. 5,166,656 to Breen, et al., which are incorporated herein in their entirety by reference thereto for all purposes. Referring to FIGS. 6-7, for example, one embodiment of a thin film fuse 10 that may be employed in the present invention is shown. As depicted, the fuse 10 includes a first insulating substrate 12 (e.g., glass) having a lower surface 14 and an upper planar surface 16 coated with a thin metallic film to define a fuse element 18. The fuse element 18 includes a pair of contact portions 20 interconnected by a fusible link 22 substantially narrower than the contact portions 20. By way of example, a fuse element having a 0.2 amp rating may have an overall length of about 3 millimeters and a width of about 1.3 millimeters, as well as a fusible link having a length of 254 micrometers and a width of 25.4 micrometers. The fuse 10 also includes a passivation layer 24 (e.g., silica) that protects the thin film fuse element 18 and the surrounding portions of the upper surface 16 of the first substrate 12. A second insulating substrate 26 (e.g., glass) is also provided that is coextensive with the first substrate 12 and has an upper surface 28 bonded to the passivation layer 24 by an adhesive layer 30 (e.g., epoxy). A bottom cover 34 (e.g., alumina) is also bonded to the lower surface 14 of the glass substrate 12 by an adhesive layer 32. Likewise, a top cover 36 (e.g., alumina) is bonded by an adhesive layer 38 (e.g., epoxy) to the top surface of the second substrate 26.

In the illustrated embodiment, the fuse 10 is in the form of a rectangular prism having parallel end planes 40 and end corners 42 bounding the end planes. End edges 44 of the fuse element contact portions 20 lie in the end planes 40. Covering the planar end surfaces 40 are conductive terminations 46, each of which is composed of an inner layer 48 of nickel, chromium, etc., and an outer solder coating 50. Each inner layer 48 is in contact with an end edge 44 of one of the contact portions 20 to provide an electrical connection between the terminations 46 and the opposed ends of the fuse element 18. The terminations 46 include lands 52 extending around the corners 42 and along portions of the lower surface of the bottom alumina cover 34 and the upper surface of the top alumina cover 36.

III. Capacitor Assembly

In addition to an electrolytic capacitor element and fuse, the fused capacitor assembly of the present invention also contains an anode termination to which the anode lead of the electrolytic capacitor element and fuse are electrically connected, and a cathode termination to which the cathode of the electrolytic capacitor element is electrically connected. Any conductive material may be employed to form the terminations, such as a conductive metal (e.g., copper, nickel, silver, nickel, zinc, tin, palladium, lead, copper, aluminum, molybdenum, titanium, iron, zirconium, magnesium, and alloys thereof). Particularly suitable conductive metals include, for instance, copper, copper alloys (e.g., copper-zirconium, copper-magnesium, copper-zinc, or copper-iron), nickel, and nickel alloys (e.g., nickel-iron). The thickness of the terminations is generally selected to minimize the thickness of the capacitor assembly. For instance, the thickness of the terminations may range from about 0.05 to about 1 millimeter, in some embodiments from about 0.05 to about 0.5 millimeters, and from about 0.1 to about 0.2 millimeters. One exemplary conductive material is a copper-iron alloy metal plate available from Wieland (Germany). If desired, the surface of the terminations may be electroplated with nickel, silver, gold, tin, etc. as is known in the art to ensure that the final part is mountable to the circuit board. In one particular embodiment, both surfaces of the terminations are plated with nickel and silver flashes, respectively, while the mounting surface is also plated with a tin solder layer.

Referring to FIGS. 1-4, one embodiment of a fused capacitor assembly 164 is shown that includes an anode termination 162 and a cathode termination 172. The cathode termination 172 is in electrical contact with a lower surface 196 and rear surface 197 of a capacitor element 122. The anode termination 162 includes a fuse coupling portion 165 and an anode coupling portion 167. The fuse coupling portion 165 corresponds to a pair of fuse connection points 173 and 175 that are spaced apart from one another a predetermined distance, which may vary depending on the size and shape of the fuse. For example, the fuse coupling portion 165 may be sized to accommodate fuses having a "0402" or "0603" form factor (in inches). It should be understood that such specific form factors are exemplary only and that connection point spacing may be provided to accommodate fuses of any other form factors.

Generally speaking, the particular manner in which the fuse is positioned within the capacitor assembly may be selected in the present invention to improve the volumetric efficiency of the capacitor assembly and enhance the ease in which the components are assembled. Referring again to FIGS. 1-4, for example, the fuse 124 may be spaced apart from the anode lead 106 of the capacitor element 122 to enhance the ease in which the fuse 124 and capacitor element 122 can be electrically connected to the anode termination 162. In the illustrated embodiment, for instance, the fuse 124 is positioned below a lower surface 103 of the fuse coupling portion 165, while the anode lead 106 is positioned above an upper surface 107 of the fuse coupling portion 165. Further, the fuse 124 may also be positioned so that its length dimension extends in a direction (−x direction in FIG. 1) that is generally perpendicular to the direction in which the anode lead 106 extends (−y direction in FIG. 1). This reduces the length of the overall capacitor assembly.

During initial production of the capacitor assembly 164, the fuse coupling portion 165 and the anode coupling portion 167 are connected so that current may bypass the fuse 124 during testing of the capacitor element 122. Such a connection between the fuse coupling portion 165 and the anode coupling portion 167 may be provided in a variety of different ways. In the embodiment illustrated in FIGS. 1-4, for instance, the fuse 124 is electrically connected to the lower surface 103 of the fuse coupling portion 165, while the anode lead 106 is electrically connected to an upper surface 151 of the anode coupling portion 167. If desired, the surface 151 may have a "U-shape" or "V-shape" for further enhancing surface contact and mechanical stability of the lead 106. A first connecting portion 111 is also provided that defines an electrical path between the fuse connection point 173 of the fuse coupling portion 165 and the anode coupling portion 167. Likewise, a second connecting portion 112 defines an electrical path between the fuse connection point 175 of the fuse coupling portion 165 and the anode coupling portion 167 via a third connecting portion 115. Although not required, the connecting portions 111, 112, and/or 115 may be curved and possess arcuate surfaces to enhance the robustness of the anode termination 162. Regardless, the connecting portions 111, 112, and/or 115 establish a connection between the fuse coupling portion 165 and the anode coupling portion 167 that allows for individual testing of the capacitor element 122. When it is desired to establish a series connection between the fuse 124 and the capacitor element 122, the third connection portion 115 may simply be cropped using known techniques, such as along an axis 195.

Although not required, an optional portion 187 may also be provided to enhance robustness. When employed, the portion 187 is connected to the fuse coupling portion 165 and the anode coupling portion 167, respectively, via the third connecting portion 115 and the second connecting portion 112. As shown, however, the portion 187 is not directly connected to the first connecting portion 111.

An encapsulating case 158 is also employed to provide electrical and thermal protection to the assembly 164, as well as additional structural support. The width and length of the case 158 may vary depending on the intended application. In one embodiment, for example, the length of the case 158 (−y direction in FIG. 1) is from about 2.0 to about 10.0 millimeters, in some embodiments from about 2.5 to about 8.0 millimeters, and in some embodiments, from about 3.0 to about 6.5 millimeters. The width of the case 158 (−x direction in FIG. 1) may range from about 1.0 to about 5 millimeters, in some embodiments from about 1.5 to about 4.5 millimeters, and in some embodiments, from about 2.0 to about 3.5 millimeter. The overall thickness of the case 158 (−z direction in FIG. 1) may optionally remain small so that the resultant assembly is readily incorporated into low profile products. For example, the thickness of the casing may be about 5.0 millimeters or less, in some embodiments, from about 0.4 to about 3.5 millimeters, and in some embodiments, from about 0.5 to about 3.0 millimeters. Suitable case sizes may include, for instance, "B", "C", "D", "E", "V", or "Z" cases (AVX Corporation).

Figure 5:
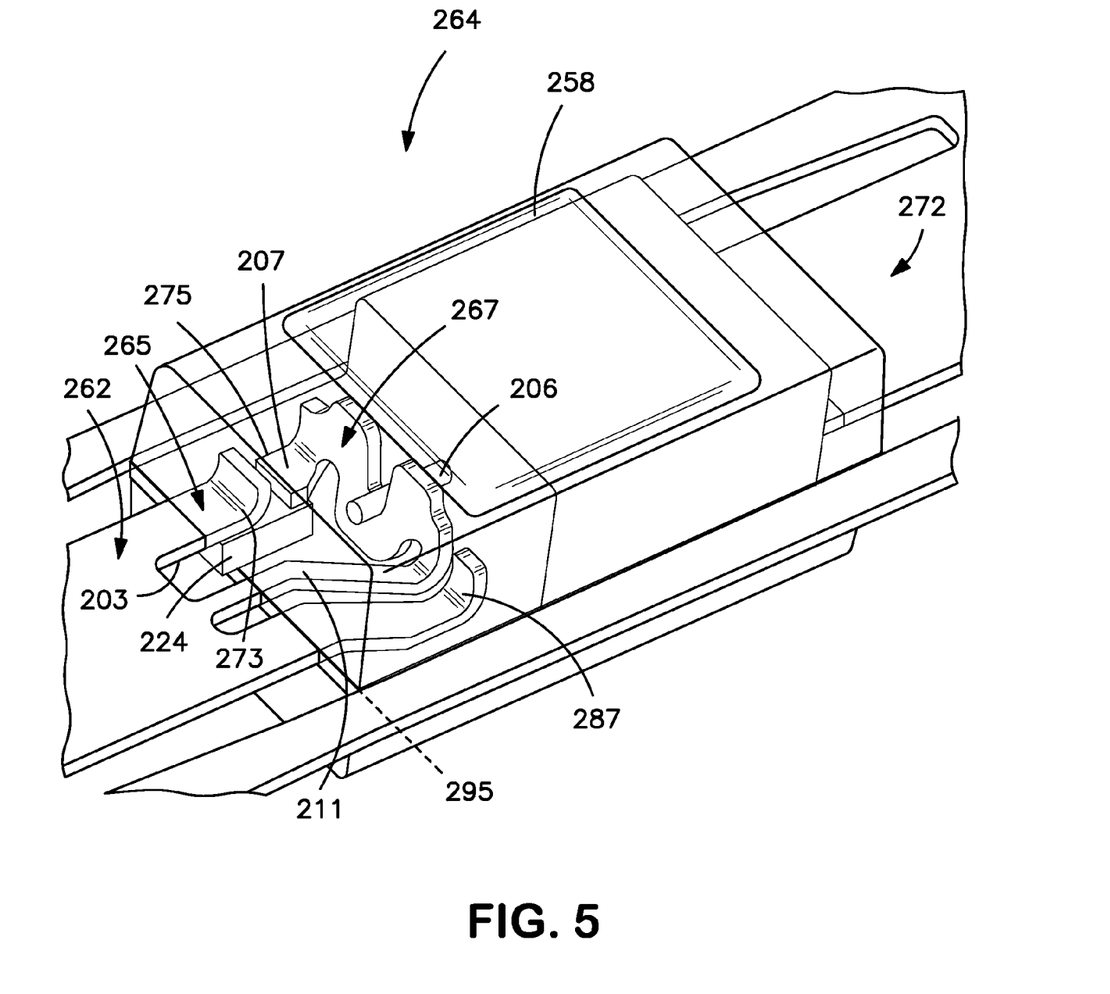
FIG. 5 is a top view of a fused capacitor assembly in accordance with another embodiment of the present invention, shown prior to isolation of the fuse and without encapsulation.

It should be understood that the present invention is by no means limited to any specific configuration for the fused capacitor assembly. Referring to FIG. 5, another embodiment of a fused capacitor assembly 264 of the present invention is shown that includes an anode termination 262 and a cathode termination 272. Similar to the embodiment shown in FIGS. 1-4, the anode termination 262 contains a fuse coupling portion 265 and an anode coupling portion 267. The fuse coupling portion 265 corresponds to a pair of fuse connection points 273 and 275 that are spaced apart from one another a predetermined distance. In the illustrated embodiment, the fuse 224 is positioned below a lower surface 203 of the fuse coupling portion 265 and the anode lead 206 is positioned above an upper surface 207 of the fuse coupling portion 265. The fuse 224 is also positioned in a direction that is generally parallel to the direction in which the anode lead 206 extends. During initial production of the capacitor assembly 264, the fuse coupling portion 265 and the anode coupling portion 267 are connected so that the fuse 224 is electrically bypassed. For example, the fuse 224 is electrically connected to the lower surface 203 of the fuse coupling portion 265, while the anode lead 206 is electrically connected to an upper surface 251 of the anode coupling portion 267. A connecting portion 211 is provided that defines an electrical path between the fuse connection point 273 and the anode coupling portion 267. Likewise, the fuse connection point 275 is defined by the anode coupling portion 267. To establish the desired series connection between the fuse 224 and the capacitor element 222, the connection portion 211 may simply be cropped using known techniques, such as along a line 295. Although not required, an optional portion 287 may also be provided to enhance robustness. An encapsulating case 258 is also employed.

Regardless of its particular configuration, the capacitor assembly of the present invention may be readily assembled in an efficient, yet effective manner. One embodiment of a technique for forming the fused capacitor assembly 164 shown in FIGS. 1-4 will now be described in more detail. Initially, a lead frame (not shown) is provided to facilitate the manufacture of capacitors in bulk. As is known in the art, the lead frame may contain a plurality of rows and columns, each of which define the cathode termination 172 and anode termination 162. To attach the electrolytic capacitor element 122 to the lead frame, a conductive adhesive may initially be applied to a surface of the cathode termination 172. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives may be described in U.S. Patent Application Publication No. 2006/0038304 to Osako, et al., which is incorporated herein in its entirety by reference thereto for all purposes. Any of a variety of techniques may be used to apply the conductive adhesive to the cathode termination 172. Printing techniques, for instance, may be employed due to their practical and cost-saving benefits.

The anode coupling portion 167 of the anode termination 162 is bent upward so that it is positioned substantially perpendicular to the bottom surface 196 of the electrolytic capacitor element 122. Thereafter, the electrolytic capacitor element 122 is positioned on the cathode termination 172 so that its bottom surface 196 contacts the adhesive and the anode lead 106 is received by the upper U-shaped surface 151. The anode lead 106 is then electrically connected to the surface 151 using any technique known in the art, such as mechanical welding, laser welding, conductive adhesives, etc. For example, the anode lead 106 may be welded to the anode termination 162 using a laser. Lasers generally contain resonators that include a laser medium capable of releasing photons by stimulated emission and an energy source that excites the elements of the laser medium. One type of suitable laser is one in which the laser medium consist of an aluminum and yttrium garnet (YAG), doped with neodymium (Nd). The excited particles are neodymium ions $Nd^{3+}$. The energy source may provide continuous energy to the laser medium to emit a continuous laser beam or energy discharges to emit a pulsed laser beam. Upon electrically connecting the anode lead 106 to the anode termination 162, the conductive adhesive may then be cured. For example, a heat press may be used to apply heat and pressure to ensure that the electrolytic capacitor element 122 is adequately adhered to the cathode termination 172 by the adhesive. The fuse 124 may then be soldered to the fuse connection points 173 and 175 as is known in the art. Alternative methodologies for securing the fuse 124 to the connection points 173 and 175 including welding, using conductive adhesives, etc.

Figure 1:
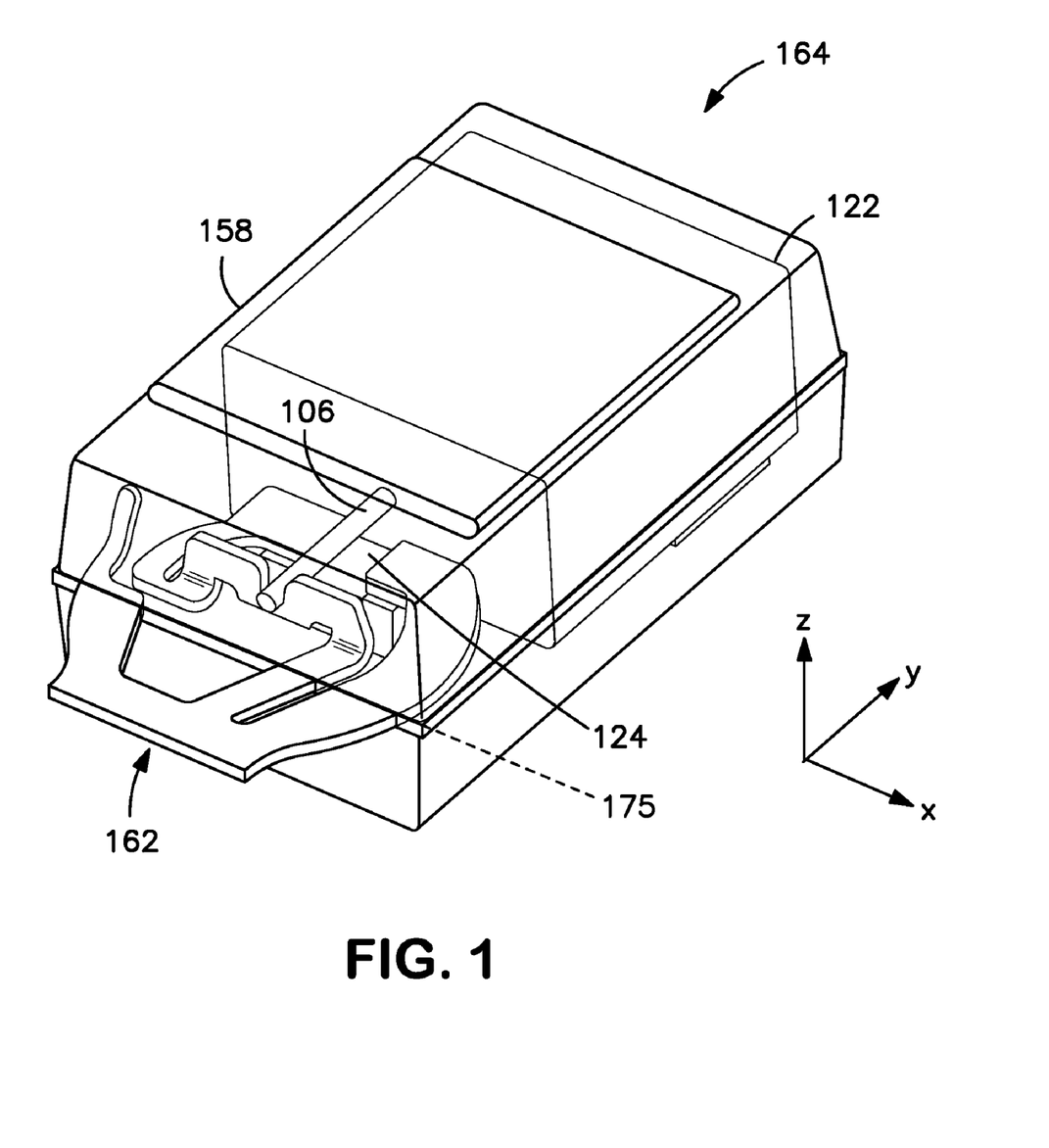
FIG. 1 is a perspective view of a fused capacitor assembly in accordance with one embodiment of the present invention, shown prior to isolation of the fuse.
Figure 2:
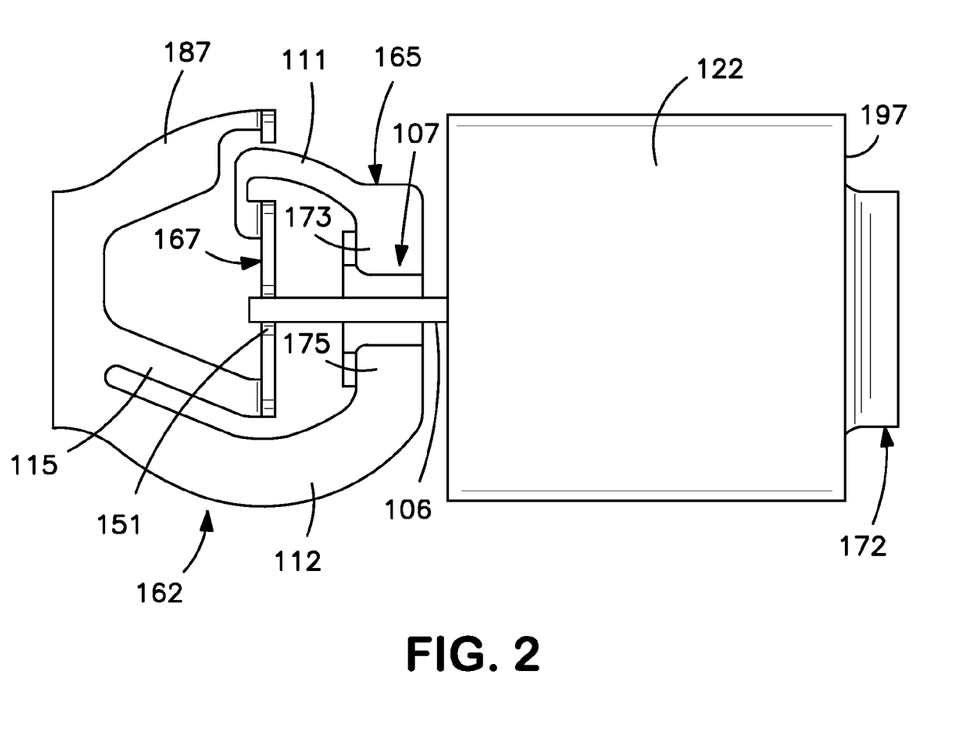
FIG. 2 is a top view of the fused capacitor assembly of FIG. 1, shown without the encapsulation case.
Figure 3:
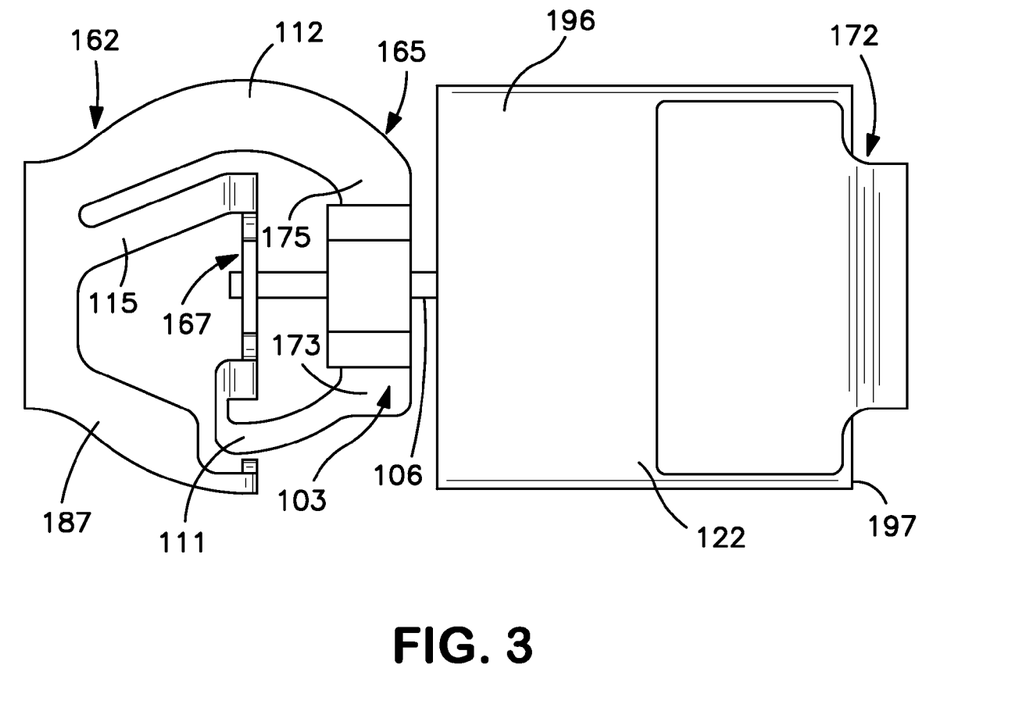
FIG. 3 is a bottom view of the fused capacitor assembly of FIG. 1, shown without the encapsulation case.
Figure 4:
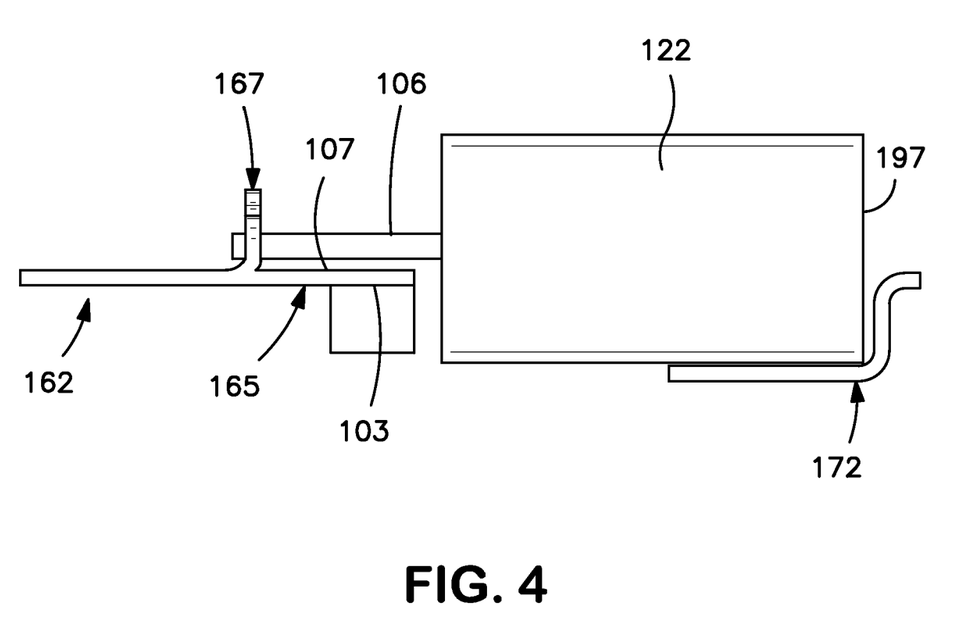
FIG. 4 is a side view of the fused capacitor assembly of FIG. 1, shown without the encapsulation case.

Once the capacitor and fuse are attached, the lead frame is enclosed within a resin casing, which may then be filled with silica or any other known encapsulating material. After encapsulation, exposed portions of the respective anode and cathode terminations 162 and 172 may be aged, screened, and trimmed. The exposed portions may be optionally bent along the outside of the case 158 (e.g., at an approximately 90° angle). In this manner, the exposed portions form J-shaped leads for the finished capacitor assembly, although any other known configuration may also be formed in accordance with the present invention. Alternatively, the exposed portions may remain unbent to facilitate subsequent electrical connection and to minimize the height of the capacitor assembly 164.

Due to the manner in which the fuse is incorporated, the resulting capacitor assembly of the present invention may exhibit excellent electrical properties. For example, the assembly may achieve a relatively low equivalent series resistance ("ESR"). For example, the ESR may be about 1,000 milliohms or less, in some embodiments about 500 milliohms or less, and in some embodiments, about 250 milliohms or less, measured with a 2-volt bias and 1-volt signal at a frequency of 100 kHz. It is also believed that the dissipation factor (DF) of the capacitor assembly may also be maintained at relatively low levels. The dissipation factor (DF) generally refers to losses that occur in the capacitor assembly and is usually expressed as a percentage of the ideal performance. For example, the dissipation factor of a capacitor assembly of the present invention is typically less than about 15%, and in some embodiments, less than about 5%, measured at a frequency of 120 Hz. The peak surge current may likewise be about 5.0 Amps or more, in some embodiments, about 10.0 Amps or more, and in some embodiments, from about 15.0 to about 50.0 Amps.

The present invention may be better understood by reference to the following examples.

TEST PROCEDURES

Equivalent Series Resistance (ESR), Capacitance, Dissipation Factor, and Impedance:

Equivalence series resistance and impedance were measured using a Keithley 3330 Precision LCZ meter with Kelvin Leads with 0 volts bias and 1 volt signal. The operating frequency was 100 kHz. The capacitance and dissipation factor were measured using a Keithley 3330 Precision LCZ meter with Kelvin Leads with 0 volts bias and 1 volt signal. The operating frequency was 120 Hz and the temperature was 23° C.±2° C.

Leakage Current:

Leakage current ("DCL") was measured using a MC 190 Leakage test set made by Mantracourt Electronics LTD, UK. The MC 190 test measures leakage current at a temperature of 25° C. and at a certain rated voltage after 10 seconds.

EXAMPLE 1

Various fused capacitor assemblies were constructed as described above and shown in FIGS. 1-4. Initially, a lead free solder paste is dropped onto a lead frame using a conventional "pick and place" machine with a pasting head. A thin film fuse (available from Bel Fuse Inc. of Jersey City, N.J., 1.25 A or 1.5 A) was then positioned onto the paste, which was then cured. A capacitor element was then connected to the lead frame as described above and shown in FIGS. 1-4. The capacitor element was formed from a pressed tantalum anode, which was anodized, impregnated with manganese dioxide, and then coated with graphite and silver layers in the manner described above. The fused capacitor assembly was encapsulated in a case having a length of about 7.5 mm, a width of about 4.5 mm, and a height of about 3.1 mm ("D" case, AVX Corp.) and was 47 µF/10V rated.

Various properties of the capacitors were then tested and compared to unfused tantalum capacitors. The results are set forth below in Table 1.

TABLE 1

Properties of Unfused and Fused Capacitors

| Sample | Avg. Leakage Current [µA] | Avg. Capacitance [µF] | Avg. Dissipation Factor | Avg. Impedance [mOhms] | Avg. ESR [mOhms] |
|---|---|---|---|---|---|
| Unfused | 0.475 | 44.453 | 0.0157 | 207.0 | 186.9 |
| Fused | 0.482 | 44.485 | 0.0186 | 281.5 | 270.3 |

As indicated, the fused capacitor assembly of the present invention maintained good electrical properties, such as a relatively low ESR. After testing, the fuse of each capacitor was isolated by a cropping tool.

EXAMPLE 2

Thin film fuses (available from Bel Fuse Inc. of Jersey City, N.J., 1.25 A or 1.5 A) were tested for their electrical resistance upon disintegration using an electrometer/high resistance meter (Model 6517A, available from Keithley Instruments, Inc.) with a 50-volt source and at a temperature of 25° C. The results are set forth below in Table 2.

TABLE 2

Resistance Measurements Upon Disintegration of Fuses

| Fuse Number[+] | R [GΩ] Measurement No | | | | |
|---|---|---|---|---|---|
| | 1 | 2 | 3 | 4 | 5 |
| 1 | 455.40 | 80.85 | 464.00 | 362.56 | 436.79 |
| 2 | 706.31 | 407.22 | 460.31 | 459.57 | 595.45 |
| 3 | 647.32 | 546.05 | 525.28 | 557.00 | 627.79 |
| 4 | 542.93 | 434.56 | 594.35 | 548.65 | 621.89 |
| 5 | 868.79 | 457.58 | 501.57 | 583.06 | 462.52 |
| 6 | *1.025 | 283.43 | 505.46 | 417.48 | 675.36 |
| 7 | 569.57 | 438.95 | 651.02 | 405.67 | 763.91 |
| 8 | 573.47 | 614.40 | 625.08 | 704.24 | 972.28 |
| 9 | 773.47 | 514.16 | 691.79 | 600.81 | 937.71 |
| 10 | 515.37 | 651.03 | 468.89 | 380.21 | 594.56 |
| 11 | 851.07 | 778.86 | 334.81 | 414.97 | 588.10 |
| 12 | 628.36 | 635.10 | 512.47 | 511.08 | 413.43 |
| 13 | 798.17 | 748.89 | 692.28 | 730.07 | 878.94 |
| 14 | 846.99 | *1.23 | 513.73 | 414.70 | 739.24 |
| 15 | 651.28 | 392.52 | 642.53 | 494.32 | 589 |

*[TΩ]
[+]Fuses 1-7 had a value of 1.25 A, while fuses 8-15 had a value of 1.5 A.

Thus, as indicated, the resistance is greater than 10 MOhms after fuse disintegration. It should also be noted that these fuses (1.25 A or 1.5 A) disintegrated when currents above 5 A were applied. Other fuses (available from Bel Fuse Inc. of Jersey City, N.J., 0.75 A, 1.0 A, or 2.0 A) were also tested and were determined to disintegrate when currents above 5 A were applied.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A fused electrolytic capacitor assembly comprising:
   an electrolytic capacitor element comprising an anode and solid electrolyte overlying the anode, wherein an anode lead extends from the anode;
   a cathode termination that is electrically connected to the solid electrolyte;
   an anode termination containing an anode coupling portion that is electrically connected to the anode lead and a fuse coupling portion that is electrically connected to a surface mount fuse, wherein the anode lead is positioned above the fuse coupling portion and the surface mount fuse is positioned below the fuse coupling portion; and
   a case that encapsulates the electrolytic capacitor element and the surface mount fuse and leaves at least a portion of the anode and cathode terminations exposed.

2. The fused electrolytic capacitor assembly of claim 1, wherein the electrolytic capacitor element contains an anode formed from a valve metal composition.

3. The fused electrolytic capacitor assembly of claim 2, wherein the valve metal composition includes tantalum.

4. The fused electrolytic capacitor assembly of claim 2, wherein the valve metal composition includes niobium or niobium oxide.

5. The fused electrolytic capacitor assembly of claim 1, wherein the solid electrolyte contains manganese oxide.

6. The fused electrolytic capacitor assembly of claim 1, wherein the solid electrolyte contains a conductive polymer.

7. The fused electrolytic capacitor assembly of claim 1, further comprising a dielectric layer formed between the anode and the solid electrolyte.

8. The fused electrolytic capacitor assembly of claim 1, wherein the surface mount fuse comprises an electrically conductive film that defines a fusible link.

9. The fused electrolytic capacitor assembly of claim 1, wherein the fuse coupling portion includes fuse connection points spaced apart a certain distance to accommodate the surface mount fuse.

10. The fused electrolytic capacitor assembly of claim 1, wherein the surface mount fuse defines a length dimension that is generally perpendicular to a length dimension of the electrolytic capacitor element.

11. The fused electrolytic capacitor assembly of claim 1, wherein the surface mount fuse defines a length dimension that is generally parallel to a length dimension of the electrolytic capacitor element.

12. The fused electrolytic capacitor assembly of claim 1, wherein the electrolytic capacitor element and the surface mount fuse are connected in series.

13. A method of forming a fused electrolytic capacitor assembly, the method comprising:
   providing an electrolytic capacitor element comprising an anode and solid electrolyte overlying the anode, wherein an anode lead extends from the anode;
   providing a lead frame that defines a cathode termination and an anode termination, the anode termination containing an anode coupling portion and a fuse coupling portion;
   electrically connecting the solid electrolyte to the cathode termination laser welding the anode lead to the anode coupling portion;
   electrically connecting a surface mount fuse to the fuse coupling portion, wherein the anode lead is positioned above the fuse coupling portion and the surface mount fuse is positioned below the fuse coupling portion; and
   encapsulating the electrolytic capacitor element and the surface mount fuse so that at least a portion of the anode termination and the cathode termination remains exposed.

14. The method of claim 13, wherein the electrolytic capacitor element contains an anode formed from a valve metal composition.

15. The method of claim 14, wherein the valve metal composition includes tantalum or niobium oxide.

16. The method of claim 13, wherein the solid electrolyte contains manganese oxide or a conductive polymer.

17. The method of claim 13, wherein the surface mount fuse comprises an electrically conductive film that defines a fusible link.

18. The method of claim 13, wherein the electrolytic capacitor element is connected to the cathode termination with a conductive adhesive.

19. The method of claim 13, wherein the fuse coupling portion includes fuse connection points spaced apart a certain distance to accommodate the surface mount fuse.

20. The method of claim 13, further comprising bending the anode coupling portion and thereafter laser welding the anode lead to an upper surface of the bent anode coupling portion.

21. The method of claim 13, wherein the surface mount fuse is soldered onto the fuse coupling portion.

22. The method of claim 13, wherein the surface mount fuse defines a length dimension that is generally perpendicular to a length dimension of the electrolytic capacitor element.

23. The method of claim 13, wherein the surface mount fuse defines a length dimension that is generally parallel to a length dimension of the electrolytic capacitor element.

24. The method of claim 13, wherein the anode termination further contains a connection portion that defines an electrical path between the anode coupling portion and the fuse coupling portion.

25. The method of claim 24, further comprising testing the electrolytic capacitor element and thereafter cropping the connection portion so that the electrolytic capacitor element and the surface mount fuse are connected in series.

* * * * *